United States Patent Office 3,420,074
Patented Jan. 7, 1969

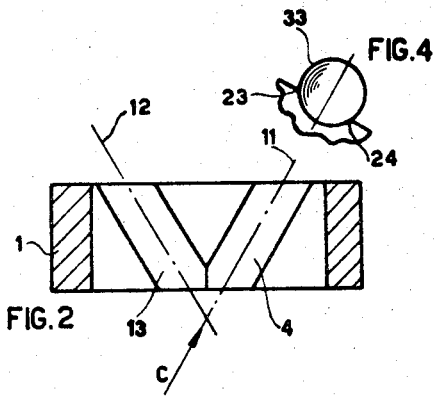
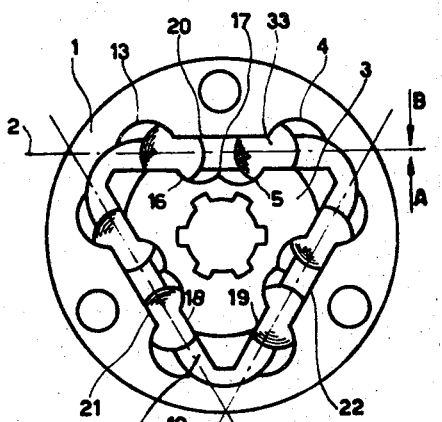
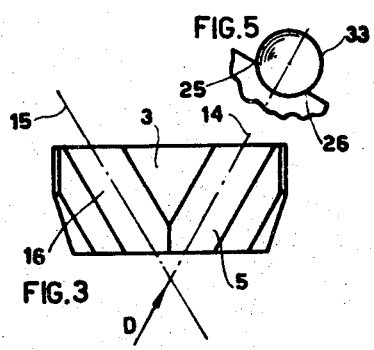

3,420,074
HOMOKINETIC UNIVERSAL JOINT CAPABLE OF ANGULARLY SHIFTING AND OF AXIALLY SLIDING
Andrea Bellomo, Strada Sant'Anna 82, Turin, Italy
Filed May 26, 1966, Ser. No. 553,220
Claims priority, application Italy, June 1, 1965,
12,477/65
U.S. Cl. 64—21        4 Claims
Int. Cl. F16d 3/30

ABSTRACT OF THE DISCLOSURE

A universal sliding joint for constant velocity includes a prismatic hub, a ring enclosing the hub and spaced therefrom, and an even number of driving balls engaged by opposed and crossing grooves formed on the outer surface and the hub and on the inner surface of the ring. At least two grooves on a prismatic face of the hub converge in one axial direction and two corresponding grooves on the ring converge in the opposite axial direction.

---

The present invention relates to a homokinetic universal and sliding joint for the transmission of power between shafts capable of angularly shifting or capable of angularly shifting and at the same time axially sliding such as are the power transmission shafts of motor vehicles, which shafts are continually subjected to relative angular and longitudinal movements as a result of wheel shaking.

The joint referred to in the present invention is of the type made up of an outer element or ring, connected to a shaft, an inner element or hub, connected to the other shaft, and an even number of balls inserted between the ring and the hub, half of which transmit the torque in one direction and half in the opposite direction, each ball being engaged and guided, without the aid of any other means such as cages or similar devices, by the crossing of two opposed grooves, one in the inside of the ring and the other on the outside of the hub. An annular space between the hub outer surface and the ring inner surface allows for relative angular and longitudinal movements between the hub and the ring, which are reciprocally guided by the same driving balls. The grooves engaging the balls have straight geometrical axes and the cross section of each groove is a circle arc with a radius which is essentially the same as the engaged ball radius.

For transmission to be homokinetic it is necessary, as it is known, that all the balls are guided by their relevant pairs of grooves so that the balls centers lie constantly on the bisecting plane of the angle between the geometrical axes of the shafts connected by the joint. For this purpose, with the shafts aligned, the hub grooves geometrical axes must cross the ring grooves geometrical axes symmetrically on a plane square to the hub and ring common axis. In addition, for the transmission of torque and the guiding of the balls to be effective, the geometrical axis of one groove of either the hub or the ring must be oblique (non-coplanar) and at a great angle to the hub axis or to the ring axis, respectively.

In the known joints of this type, the hub outer surface and the ring inner surfaces are revolving surface around the hub axis or the ring axis, respectively. As a result, the working surface of a groove, as delimited by the intersection of the cylindrical surface generating the groove with the hub outer surface or the ring inner surface, respectively, has a rapidly decreasing amplitude from one groove extremity to the other. Actually, the amplitude of the bearing arc which a groove offers to its relevant ball is not sufficient to provide the ball with effective guide and bearing throughout the complete working run of the ball in the groove; specially if it is considered that between the hub outer surface and the ring inner surface there is, as it was stated, an annular space which greatly reduces the working surface of the grooves.

This problem is overcome in the present invention by shaping the hub outer surface and the ring inner surface so that a constant or almost constant and sufficiently ample bearing and guide arc is provided by the grooves for their relative balls throughout the complete working run and at no extra cost in the manufacturing of the assembly.

The invention is described with reference to the FIGURES 1 through 5:

FIG. 1 is a view in the direction of the axis of a six-ball joint shown in the aligned shafts position;

FIG. 2 is a section of ring 1 of FIG. 1 along the plane 2 and viewed in the direction of arrow A;

FIG. 3 is a view, in the direction of arrow B, of the hub 3 of FIG. 1;

FIG. 4 is a view, in the direction of arrow C, of the groove 4 of ring 1 with the relevant ball resting in the groove;

FIG. 5 is a view, in the direction of arrow D, of the groove 5 of hub 3, with the relevant ball resting in the groove.

In FIG. 1, as an example, the geometrical axes of the grooves of the hub 3 and the ring 1 lie on the planes 2, 9 and 10, which are parallel to the shafts alignment axis (axis square to the drawing plane) and are positioned so as to delimit, on the drawing plane, an equilateral triangle. The geometrical axes 11 and 12 of the ring grooves 4 and 13 and the geometrical axes 14 and 15 of the hub grooves 5 and 16 lie on plane 2 and similarly for planes 9 and 10.

According to the present invention, the hub 3 outer surface includes three planes 17, 18 and 19 parallel to planes 2, 9 and 10, respectively, on which lie the grooves geometrical axes. A cross section of the hub outer surface is thus an equilateral triangle with its vertices eventually removed as in FIG. 1.

Similarly, the ring 1 inner surfaces includes three planes 20, 21 and 22 parallel to the planes 17, 18 and 19, respectively, which delimit the hub, so that a cross section of the ring inner surface is an equilateral triangle with its vertices eventually blended as in FIG. 1. It turns out then that one groove in either the hub or the ring is cut by a plane of the hub outer surface or the ring inner surface, respectively, always at the same distance from the groove geometrical axis and, as a result, a ball guide and bearing arc is obtained that has a constant amplitude along the groove. The bearing arc 23–24 which the groove 4 of ring 1 provided for the ball 33 throughout the groove length is shown in FIG. 4. Similarly, FIG. 5 shows the bearing arc 25–26 which the groove 5 of hub 3 provides for the same ball 33 throughout the groove length. In this manner bearing arcs up to 120 degrees and greater are obtained, yet leaving a space 30 between the hub and the ring sufficient to allow the desired relative angular and longitudinal movements.

As an example, for the joint shown in FIG. 1 adjacent converging grooves are shown as the grooves 4 and 13 on an inner surface of the ring 1 shown in FIG. 2 and the grooves 5 and 16 on an outer face of the prism shown in FIG. 3.

A joint according to the present invention does not involve any increase in the manufacturing cost as compared to the known joints in which the hub outer surface and the ring inner surfaces are revolving surface which can be obtained, for example, by turning.

In fact, a hub with prismatic outer surface can be either hot forged or cut from a rolled or a drawn bar without the prism faces having to be further machined. Similarly, a ring with a prismatic inner surface can be either hot forged or cut from a rolled or a drawn or an extruded tube without the ring internal prismatic surface having to be further machined; at the most it could be broached if a precision item is required.

What I claim is:

1. A homokinetic universal joint capable of angularly shifting and of axially sliding comprising an outer element connected to a shaft, an inner element connected to the other shaft, a space between the outer element inner surface and the inner element outer surface and an even number of driving balls inserted between the said two elements, each ball being engaged and guided, without the aid of any other means, by two opposed and crossed grooves, one groove on the outer element inner surface and another groove on the inner element outer surface, characterized in that the outer element inner surface and the inner element outer surface are essentially prismatic surfaces having each a number of faces equal to half the number of the driving balls, each face of the outer element inner surface being parallel to a corresponding face of the inner element outer surface when the shafts connected by the joint are aligned, and in that at least two grooves on a prismatic face of the inner element converge in one axial direction and the corresponding grooves of the outer element converge in the opposite axial direction.

2. A joint in accordance with claim 1, wherein all grooves of the inner element diverge from the axis of alignment of the shafts in one axial direction and all grooves of the outer element diverge from said axis in the opposite axial direction.

3. A joint in accordance with claim 1, wherein the axes of the grooves of the inner element overlap the axes of the grooves of the outer element upon relative turning of one of said elements to the extent of 180° from the assembling position.

4. A joint in accordance with claim 1, wherein the axes of four grooves of an adjacent pair of balls lie in a common plane when the shafts connected by the joint are aligned.

References Cited

UNITED STATES PATENTS

| | | | |
|---|---|---|---|
| 3,002,364 | 10/1961 | Bellomo | 64—21 |
| 2,762,211 | 9/1956 | Bellomo | 64—21 |
| 3,296,834 | 1/1967 | Grauel | 64—21 |
| 3,298,200 | 1/1967 | Altmann et al. | 64—21 |

HALL C. COE, *Primary Examiner.*